United States Patent
Zhi et al.

(10) Patent No.: US 10,374,915 B1
(45) Date of Patent: Aug. 6, 2019

(54) METRICS PROCESSING SERVICE

(71) Applicant: Amazon Technologies, Inc., Seattle, WA (US)

(72) Inventors: Xiqiang Zhi, Bellevue, WA (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 492 days.

(21) Appl. No.: 14/754,388

(22) Filed: Jun. 29, 2015

(51) Int. Cl.
*H04L 12/26* (2006.01)

(52) U.S. Cl.
CPC ........ *H04L 43/065* (2013.01); *H04L 43/0876* (2013.01)

(58) Field of Classification Search
CPC . H04L 43/065; H04L 41/069; H04L 41/5009; H04L 43/00; H04L 67/101; H04L 45/48; H04L 43/04; H04L 43/06; H04L 12/26; H04L 12/2803; G06F 1/3287; G06F 21/602; G06F 21/62; G06F 11/3055
See application file for complete search history.

(56) References Cited

U.S. PATENT DOCUMENTS

| | | | | |
|---|---|---|---|---|
| 5,535,335 A * | 7/1996 | Cox | ..................... | G06F 11/3006 709/221 |
| 6,529,498 B1 * | 3/2003 | Cheng | ................... | H04L 12/185 370/351 |
| 6,757,286 B1 * | 6/2004 | Stone | ................. | H04L 12/4645 370/238 |
| 7,006,444 B1 * | 2/2006 | Stone | .................. | H04L 12/2854 370/238 |
| 7,506,321 B1 * | 3/2009 | Irving | ................. | G06F 9/45504 703/26 |
| 7,512,673 B2 * | 3/2009 | Miloushev | .......... | G06F 11/1076 709/221 |
| 7,802,264 B2 * | 9/2010 | Robertson | ...... | G06Q 10/063112 709/215 |
| 9,461,877 B1 * | 10/2016 | Nadeau | .................... | H04L 41/12 |
| 9,680,874 B1 * | 6/2017 | Burnett | .................... | H04L 63/20 |
| 9,703,594 B1 * | 7/2017 | Kamboj | ................ | G06F 9/4806 |
| 2002/0001337 A1 * | 1/2002 | Chauncey | ................ | H04K 1/02 375/132 |
| 2002/0147611 A1 * | 10/2002 | Greene | .......... | G06Q 10/063112 705/1.1 |
| 2002/0178026 A1 * | 11/2002 | Robertson | ...... | G06Q 10/063112 709/220 |
| 2004/0030778 A1 * | 2/2004 | Kronenberg | .......... | H04L 41/069 709/224 |
| 2006/0150028 A1 * | 7/2006 | Blaisdell | ............... | G06F 11/008 714/39 |
| 2008/0021844 A1 * | 1/2008 | Sanwal | .................. | G06Q 40/04 705/36 R |
| 2012/0060198 A1 * | 3/2012 | Tremblay | ............ | H04L 12/1407 726/1 |

* cited by examiner

*Primary Examiner* — Sargon N Nano
(74) *Attorney, Agent, or Firm* — BakerHostetler

(57) ABSTRACT

A distributed services platform may generate a plurality of log files containing metric values. Metric values may be provided to a first level of a topology of aggregation modules. The first level of aggregation modules may provide output to a second level of the topology. Subsequent levels of the topology may perform greater amounts of aggregation while providing stream-based access to the aggregated values. State information for the aggregation topology may be saved subsequent to each cycle of values through the topology.

20 Claims, 9 Drawing Sheets

METRICS PROCESSING SERVICE

BACKGROUND

The provision of hosted computing capabilities may involve operating a number of services on a distributed computing platform. The operation of these services may produce potentially large quantities of operational data that can, at times, be useful for gaining insight into the operating characteristics of the various services. In some cases, insight may be gained through examination of metric values that are indicative of the operating characteristics. Typically, these metric values may be coalesced or aggregated into forms that are useful for analysis. However, conventional approaches to metrics processing may be unwieldy when large quantities of data are involved.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
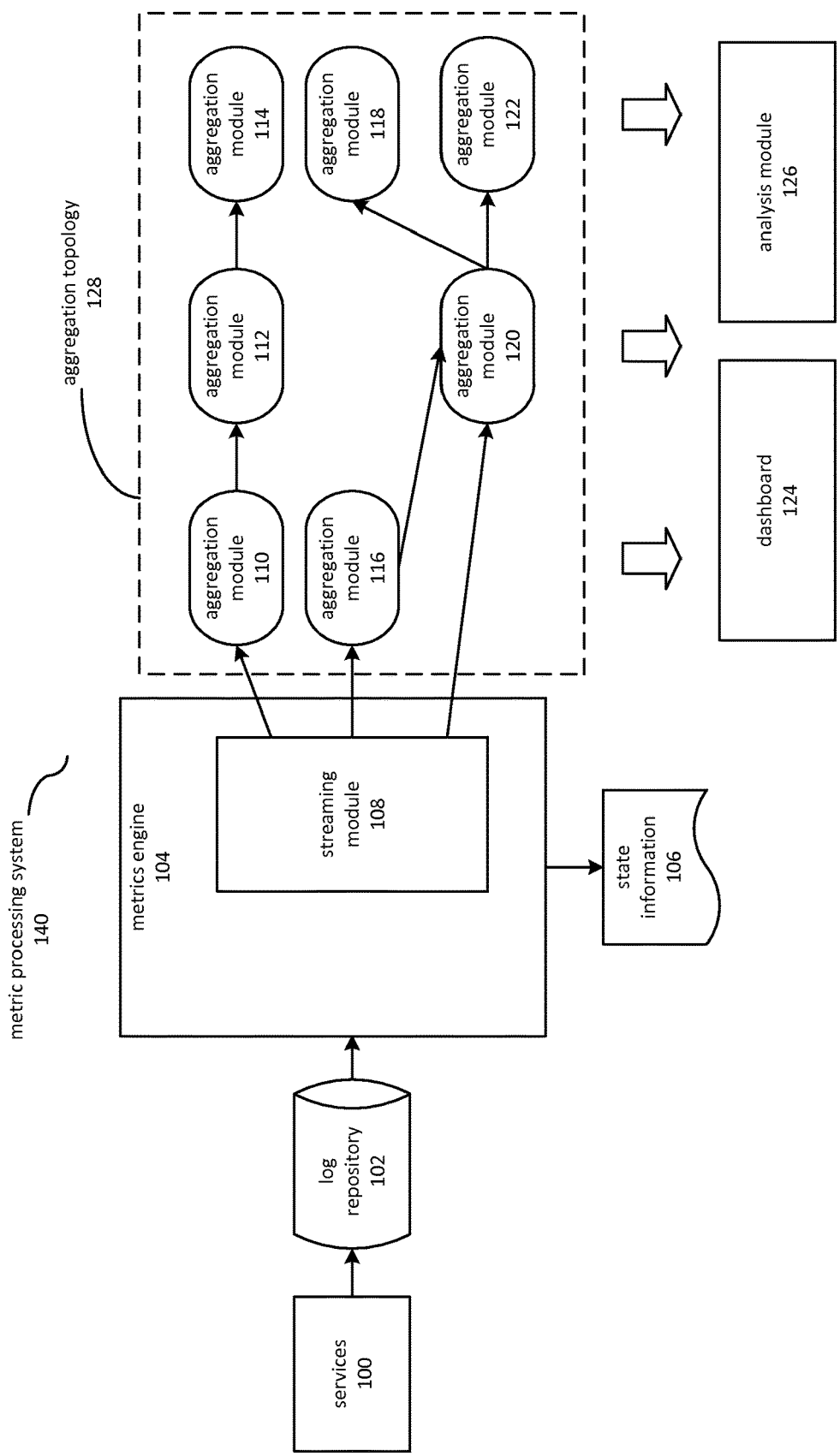
FIG. 1 is a block diagram depicting a metrics processing system.

Disclosed herein are systems and methods for processing metric information obtained from the operation of a distributed service platform. A distributed service platform may typically comprise a number of services, each of which may be highly active and, as a result, generate a large amount of log data that may be culled for metrics that provide insight into the operation of the services.

As described herein, metric values may be extracted from the log data and processed according to a series of operations performed by a topology of aggregation modules. The aggregation modules may each include instructions for calculating an aggregate value from a number of input values. At the first level of the topology, the aggregation modules may be provided with raw metric values from the log files.

At subsequent levels of the topology, the aggregation modules are supplied with data obtained from aggregations performed at a higher level. For example, a first-level aggregation module might calculate, using raw metric values, the average value of the metric for a 60-second interval. A second level might be provided with the 30-second averages as input, and use the 60-second averages to calculate an average over a five-minute interval. Output from each aggregation module may also be provided to a dashboard or other client application in order to provide users with access to the information.

In an example, a service may generate a plurality of log entries during the course of its operation. The log entries may, for example, be written to files on a storage device. The log entries may contain various metric values. A metric value can refer to some quantity, flag, or other indicator that reflects an aspect of the operation of the system. Typically, metric values are numeric. Examples include, but are not limited to, values such as a number of requests processed, the time it took to process a request, a delay incurred before processing a request began, CPU cycles utilized during processing of a request, and so forth. In some cases, metric values may be non-numeric. Examples include but are not limited to letter grades, category indicators, and so forth.

During the course of its operation, the service may write metric information to one or more log files. Typically, the service writes data to the log files on an ongoing basis. In some cases, the service may append additional data to existing log files, while in other cases the service may create new log files. A detector module may monitor existing and new log files for metric data. When new data is available, it may be provided to aggregation modules at the first level of an aggregation topology.

An aggregation topology may comprise information that describes the input and output relationships of various aggregation modules. The topology may also indicate the aggregation modules and the aggregation periods associated with the aggregation modules. The aggregation module may, in some cases, be expressed as configurable metadata. In other cases, the topology may be expressed using computer-executable instructions that configure and interconnect various aggregation modules and thereby express a topology.

In an example, a first aggregation module and a second aggregation module may be identified based on the aggregation topology. The first aggregation module may correspond to a first level of the topology, and the second aggregation module may correspond to a second level of the aggregation topology.

A detector module may determine that new data is available in a log file and extract it. The detector module might, for example, supply a metric value to the first aggregation module. The first aggregation module may process the value, typically by updating its internal state. This could, for example, involve the aggregation module updating a running total or average of values that have been supplied to it over an aggregation period.

The log file may comprise structured or unstructured data. Examples include, but are not limited to, binary files, text files in row-and-column format, delimited text files, Extensible Markup Language ("XML") files, and so on. A log file may include data, described herein as log data, that was collected, formed, calculated, obtained, or captured during the operation of a service. Log data may also include other data describing the operation or behavior of a service, system, process, or entity.

The first aggregation module may, upon being supplied with sufficient input, produce an output. For example, if the first aggregation module is associated with a 30-second aggregation period, and values are supplied to it once per second, it might produce an output value after the 30th input.

The output of the first aggregation module may be provided as input to the second aggregation module. The second aggregation module may then, when supplied with sufficient input from the first aggregation module, produce a value for the aggregation period represented by the second aggregation module.

The state of the aggregation modules in the topology may be saved once per cycle. Each cycle may include providing a raw metric value to a first-level aggregation module, and providing any outputs produced by the first level aggregation module to a second-level aggregation module, and so on. Saving the state of the aggregation modules may permit metric processing to resume without significant data loss or duplication in the event of a system failure.

FIG. 1 is a block diagram depicting a metrics processing system 140. The metrics processing system 140 may perform multilevel aggregations on various metrics obtained from operating one or more services 100. In some instances, the multilevel aggregations may be transmitted to a dashboard 124, analysis module 126, or other client process that may consume the data. The multilevel aggregations may, in some instances, be used to present an up-to-date or approximately real-time view of the operation of the services 100.

The services 100 may include various web services, application programming interfaces, databases, and so forth. The services 100 may include software executing on one or more computing nodes. In some instances, the services 100 may be hosted by a provider on behalf of a customer.

The services 100 may, in the course of their operation, write log entries to a log repository 102. The log repository 102 can include various storage devices such as distributed storage services, driver arrays, solid-state drives, and so forth. The log entries may be stored within various files. In some instances, a log file may contain log entries for a service or groups of services. The log entries in the file may correspond to a given time period. In some instances, the log file may be named using a naming pattern that incorporates the service or services to which it applies, and the time period to which it applies. Typically, the services 100 may generate a significant quantity of log entries within each file, and over time a significant number of log files may accumulate on the log repository 102.

A metrics engine 104 may monitor the log repository 102 for log entries that have been added to new or existing files. The metrics engine 104 may, for example, monitor a location within the log repository 102 for new log files that have been added. The metrics engine 104 might also monitor known log files for new segments that contain log entries that have not yet been processed. In some instances, the metrics engine may identify portions of the log files that correspond to a time period, such as a ten-minute interval. The log engine may determine whether or not a set of data corresponding to the time period is available to be processed.

The metrics engine 104 may process log entries by accessing values in the log file and providing those values to one or more aggregation modules 110 and 116. The values may be provided to the aggregation modules 110 and 116, and to additional downstream aggregation modules 112, 114, 118, 120 and 122 via a streaming module 108.

An aggregation topology 128 may describe interrelationships between various metrics that may be calculated based on values extracted from the various logs maintained on the log repository 102. The aggregation topology 128 can include information describing input and output relationships between various aggregation modules 110-122. The aggregation topology 128 may involve a directed acyclic graph of data flow between its constituent aggregation modules 110-122. The information described by the aggregation topology 128 may include an indication that aggregation modules 110 and 116 are "first-level" aggregation modules, meaning that that take raw values as input. The aggregation topology 128 might also include information indicating that aggregation module 112 accepts input from the aggregation module 110, and that aggregation module 120 accepts input from aggregation module 116.

An aggregation module, such as any of aggregation modules 110-122, may comprise computer-executable instructions for calculating an output value from one or more input values. Typically, an aggregation module 110-122 may perform summation or averaging operations for an aggregation period that is associated with the aggregation module 110-122. For example, a set of aggregation modules 110 and 116 might perform aggregations over a 60-second aggregation period, a second set of aggregation modules 112 and 120 might perform aggregations over 300-second intervals, and a third set of aggregation modules 114, 118, and 122 might perform aggregations over a 24-hour period.

The streaming module 108—which may be incorporated in whole or in part into the metrics engine 104—may include processor-executed instructions for providing values extracted from a log file, or other source of metrics data, to aggregation modules in a first level of a hierarchy of aggregation modules. The streaming module 108 may also include processor-executed instructions for obtaining the output of first-level aggregation modules and supplying the output to subsequent levels of the aggregation topology.

The metrics engine 104 may maintain state information 106 regarding log entries that have been processed and, in some instances, the state of the various aggregation modules 110-122. The state information may, for example, include offsets into various log files indicating which portions of the log files have been processed. An entry in a log file (or other source of metrics data) may be deemed to have been processed when it has had a committed effect on the metric processing system. For example, the metrics engine 104 may read a metric value from the log repository 102 and, via streaming module 108, supply the value to the first-level aggregation modules 110 and 116. The first-level aggregation modules might then adjust their states to reflect the newly supplied value. For example, when the aggregation module 110 receives a value from the metrics engine 104, it might add the value to a running total that it converts to a desired metric at the end of an aggregation period. Once the value has been incorporated into the running total, the value may be treated as committed so long as the running total value is durable. The metrics engine 104 may save state information for the various aggregation modules 110-122 after supplying the first-level aggregation modules 110 and 116 with raw values and supplying other aggregation modules 112, 114, 118, 120 and 122 with the output of prior-level aggregation modules, if such output is produced. Since each level of aggregation in the aggregation topology may be greater than in a previous level, first-level aggregation modules may produce output more frequently than second-level aggregation modules, second-level aggregation modules may produce output more frequently than third-level aggregation modules, and so on. For example, aggregation module 116 might correspond to a 60-second aggregation period, while aggregation module 120 might correspond to a 300-second aggregation period. The aggregation module 116 might therefore produce output with five times greater frequency than the aggregation module 120.

The metrics engine 104 may, after each cycle of providing inputs to the various aggregation modules 110-122, save state information 106. The state information 106 may comprise running totals or other data associated with each of the aggregation modules 110-122. The state information 106 may also include offsets or pointers into various log files or other data sources. In some instances, a time value may be used as an offset. For example, a plurality of log files might contain a number of log entries accompanied by time values. A time value can be stored with state information 106 to indicate which values within the plurality of log files has been processed.

Figure 2:
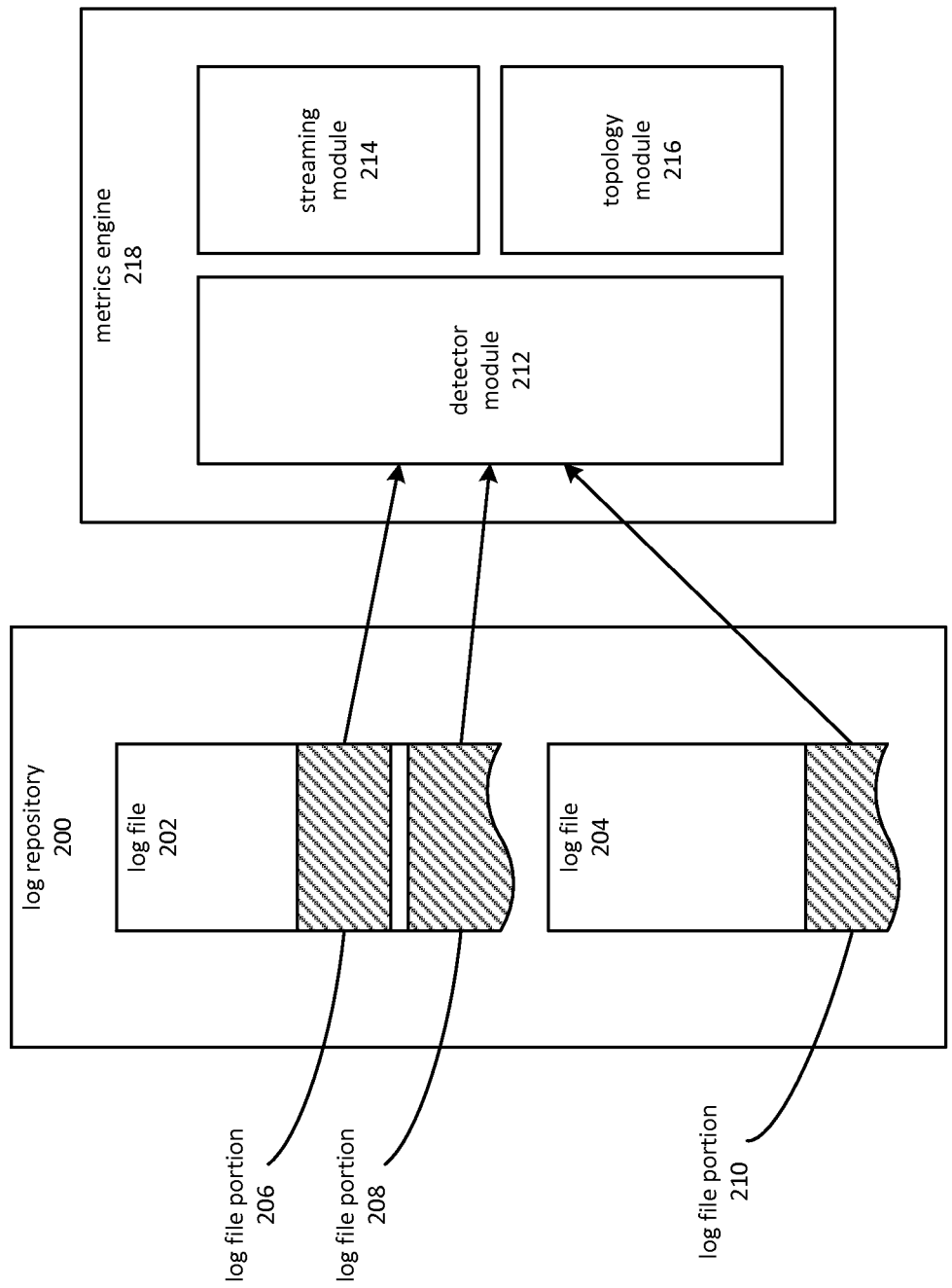
FIG. 2 is a block diagram depicting an example system providing a stream of data values to an aggregation topology.

FIG. 2 is a block diagram depicting an example system providing a stream of data to an aggregation topology. In the example of FIG. 2, a metrics engine 218 may comprise a detector module 212, which obtains raw metric values from log files 202 and 204 stored on log repository 200. The detector module 212 may extract data from the log files 202 and 204 and transmit them, via a streaming module 214 and topology module 216, to the first-level aggregation modules in a topology of aggregation modules.

A log repository 200 may comprise various storage devices on which various systems write log files 202 and 204. The log files 202 and 204 may comprise various metrics that are indicative of the health or status of the various systems. For example, the log files 202 and 204 might contain metric values corresponding to the amount of time it took for a system to finish processing a request.

A component of the metrics engine 218, which may be described as a detector module 212, may monitor the log repository 200 for new log files. Once a log file has been detected on log repository 200, the metrics engine 218 may begin to process it by extracting metric values from it and providing the extracted values to an aggregation topology.

Typically, each of the log files 202 and 204 may contain a large number of entries. In various instances, the log files 202 and 204 may be processed in segments. This may be done, for example, in order to provide an approximation of real-time access to the log information, since it obviates the need to wait until a given log file has been fully written before it is processed.

The detector module 212 may detect when additional unprocessed portions of log files 202 and 204 are available. For example, a log file 202 might initially contain a log file portion 206. The metrics engine 218 may process the contents of the log file portion 206 and store state information indicating a point within log file 202, where all data prior to that point has been processed. For example, the metrics engine 218 might record an offset or a time value indicative of the end of log file portion 206 once processing of the data within log file portion 206 has been completed.

A second log file portion 208 might be written to log file 202. The detector module 212 may detect that the second log file portion 208 has been written to the log file 202. In addition, the detector module 212 may determine, based on information such as an offset into the log file 202 or a time value, that the data in the log file portion 208 has not been processed.

The metrics engine 218 may include a streaming module 214 and a topology module 216. The topology module 216 may include computer-executable instructions for obtaining input and output relationships of aggregation modules. This may involve mapping from the types and/or identities of input data to a first-level aggregation module, and from the output of an aggregation module associated with a first aggregation level to the input of an aggregation module associated with a second aggregation level. Note that the aggregation module at the second level does not receive values from the log files 202 and 204 directly. Instead, aggregation modules other than first-level aggregation modules receive input from other aggregation modules. For example, a first-level aggregation module corresponding to a 60-second aggregation period might receive input from the log files 202 and 204. A second-level aggregation module, corresponding to a 300-second aggregation period, might only receive the 60 second aggregated values produced by the first-level aggregation module.

The streaming module 214 may contain computer-executable instructions for causing the values from the log files 202 and 204 to be provided to appropriate first-level aggregation modules. The topology module 216 may further include computer-executable instructions for causing the output of various aggregation modules to be provided as input to certain other aggregation modules, according to the topology.

Figure 3:
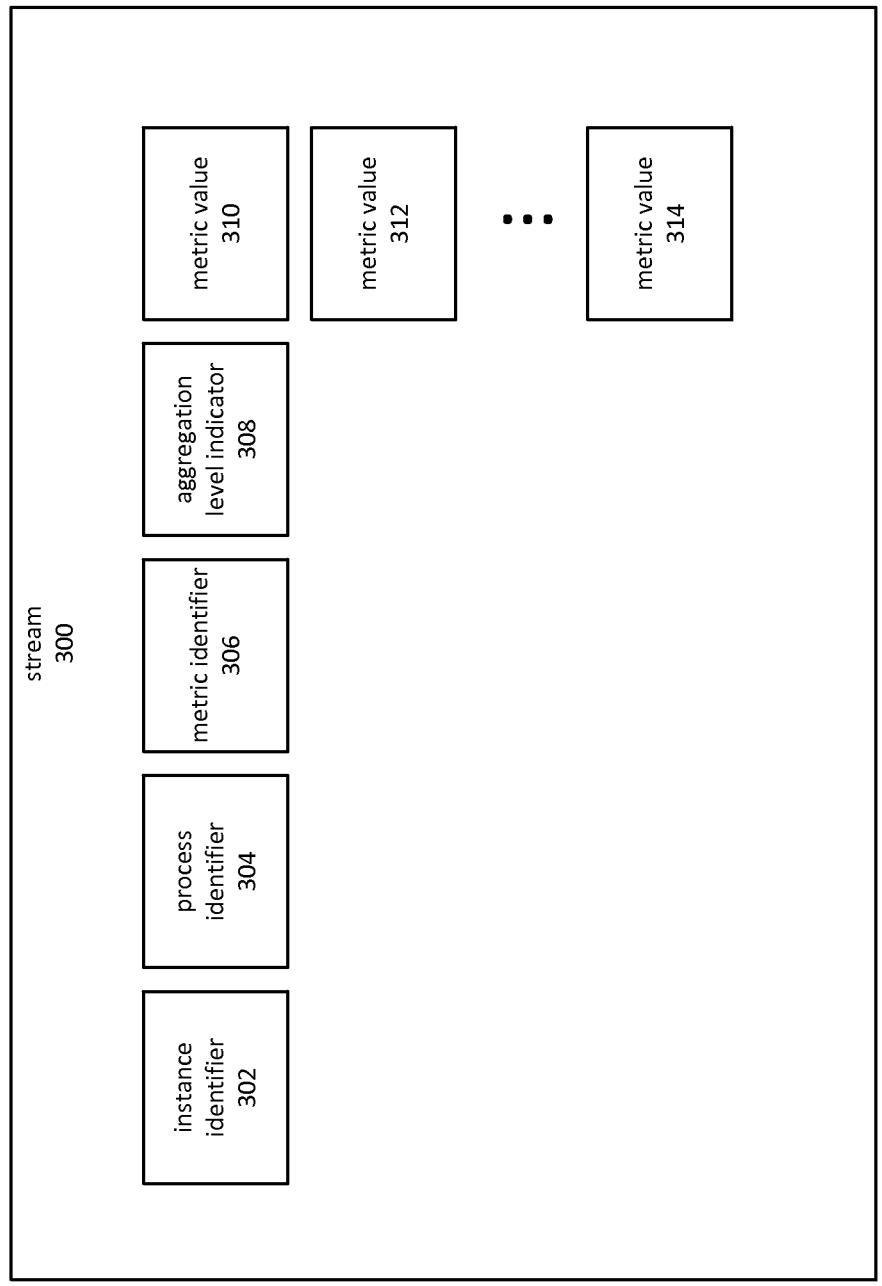
FIG. 3 is a block diagram depicting an example of data provided by the streaming module to an aggregation module.

FIG. 3 provides an example of data provided by the streaming module 214 to an aggregation module. It will be appreciated that the example provided by FIG. 3 is intended to be illustrative of one possible approach, among many, to providing data to the aggregation modules. Accordingly, the example provided by FIG. 3 should not be construed as limiting the scope of the present disclosure.

A streaming module, such as the streaming module 214 depicted in FIG. 2, may provide a stream 300 comprising records such as those depicted in FIG. 3. Metric values may be communicated to the aggregation modules via the depicted structured. A sequence of metric values may be described by a row of data comprising an instance identifier 302, a process identifier 304, a metric identifier 306, an aggregation level indicator 308, and one or more values 310-314.

An instance identifier 302 may identify a service, computing node instance, or other entity associated with the corresponding metric values 310-314.

A process identifier 304 may indicate an additional entity associated with the corresponding metric values 310-314.

In some cases, the instance identifier 302 and the process identifier 304 may be combined or substituted for one or more other identifiers. In some cases, the combination of instance identifier 302, process identifier 304, metric identifier 306, and aggregation level indicator 308 may comprise a unique key that identifies records for a group of related metric values 310-314. The metric values 310-314 that may be needed to calculate an aggregated value may be accessible from the streaming module 214 based on a key of this type.

The metric identifier 306 may identify the particular metric to which metric values 310-314 relate. For example, the metric identifier 306 might correspond to a "requests per second" metric or a "delay in milliseconds" metric.

The aggregation level indicator 308 may be used to indicate the level of aggregation that is reflected in metric values 310-314. For example, an aggregation level indicator 308 of "0" might indicate that the values 310-314 correspond to raw values obtained from a log file or other data source. An aggregation level indicator 308 of "1" might indicate a 60-second aggregation period, and so on. The aggregation level indicator 308 may be expressed in relation to the number of aggregation modules, within a topology, that correspond to the metric at hand.

The stream 300 may include a number of metric values 310-314 associated with a particular aggregation level. The values 310-314 may correspond to aggregated values at points in time that are aligned with the corresponding aggregation period. For example, values 310-314 might correspond to an aggregation period of 60 seconds. In this case, metric value 310 might indicate the value of the metric during a first 60-second period, metric value 312 during the next 60-second period, and so on. The metric values 310-314 may be obtained from the stream 300 as an ordered set.

Figure 4:
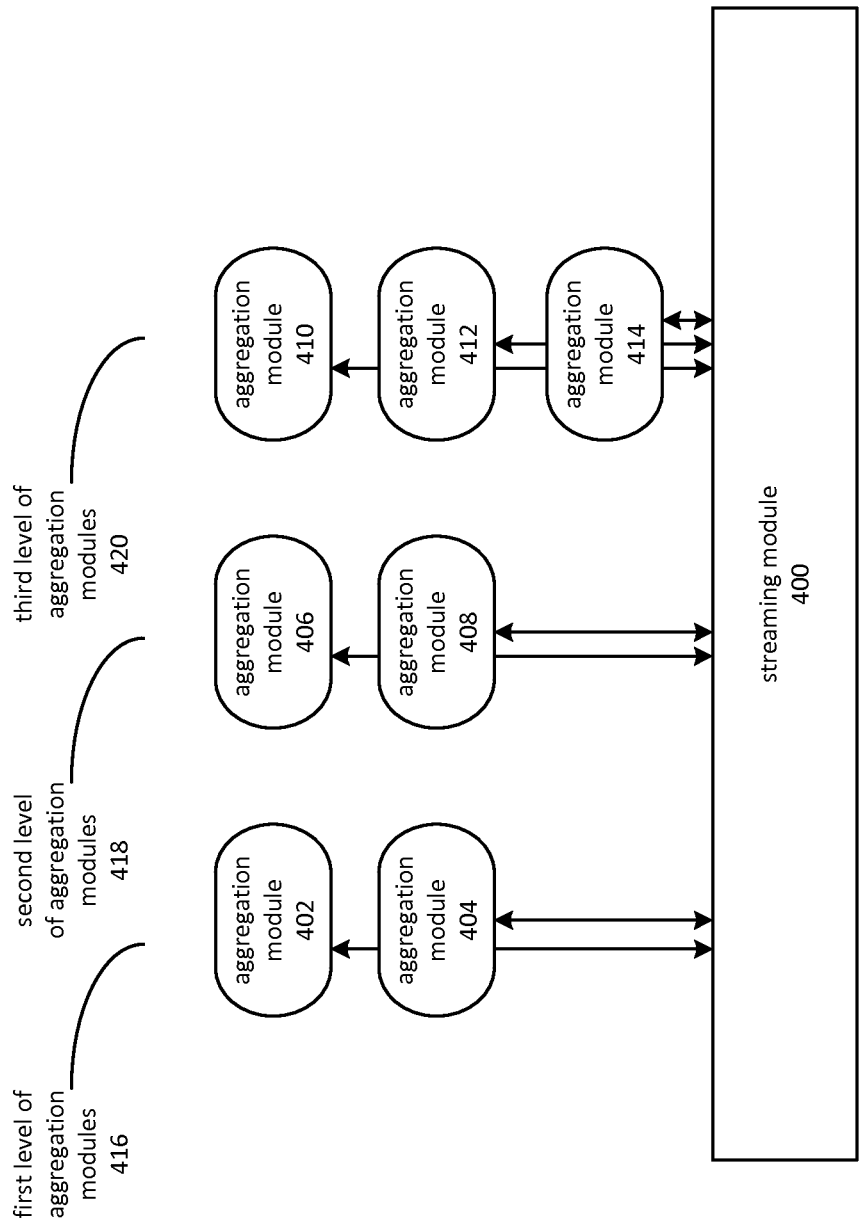
FIG. 4 is a block diagram depicting an example of providing metric values to levels of an aggregation topology.

FIG. 4 is an example of providing metric values to levels of an aggregation topology. An aggregation topology 128 may comprise a plurality of levels, depicted in FIG. 4 as a first level of aggregation modules 416, a second level of aggregation modules 418, and a third level of aggregation modules 420. The first level of aggregation modules 416 may correspond the shortest or smallest period of aggregation and may, for example, accept values from a log file as input. The second level of aggregation modules 418 may correspond to a longer or larger period of aggregation relative to the first level of aggregation modules 416, and may accept as input the output of one or more of the first level of aggregation modules 416. The third level of aggregation modules 420 may, similarly, have the longest or largest aggregation period and may accept values from the second level of aggregation modules 418 as input.

The streaming module 400 may facilitate transfer of data between the successive levels of the aggregation topology 128. Data may be received into the stream from a detector module 212 in a format similar to that of the stream record 300 depicted in FIG. 3. The aggregation modules 402 and 404 in the first level of aggregation modules 416 may be provided with the data using a "push" mechanism or a "pull" mechanism. For example, the data might be pushed to the aggregation modules 404 and 402 as parameters to functions that perform the aggregation in each of the respective aggregation modules 402 and 404. Or, using a pull model, the aggregation modules 402 and 404 might each request a copy of the data from the streaming module 400. In either case, the streaming module 400 may enforce data flow between the aggregation modules 402-414 consistent with the aggregation topology 128.

In some instances, the streaming module 400 and the aggregation modules 402-404 may operate using a source-sink methodology. Certain elements may act as data sources, sometimes referred to as publishers. Other elements may act as data sinks, sometimes referred to as subscribers. Some elements, such as those in the interior of the aggregation topology 128, may be both sources and sinks. The streaming module 400 may, in some instances, configure the source-sink relationships between the aggregation modules 404-414. By appropriately configuring the source-sink relationship of the aggregation modules 404-414, the streaming module 400 may cause data to flow between the aggregation modules 404-414 consistent with the aggregation topology 128.

Each value provided to an aggregation module 402 may result in an adjustment to a state associated with the aggregation module 402 and may also produce an output value. For example, assume that a data value is provided once per second to an aggregation module 402 associated with a 60-second aggregation period. The first 59 values provided during the aggregation period may change the state of the aggregation module, but typically would not produce a value, although, in some cases, an estimated value might be provided. However, a finished aggregate value might be produced once the $60^{th}$ value is provided to the aggregation module 402.

The streaming module 400 may receive output from the aggregation modules 402 and 404 in the first level of aggregation modules 416 and forward it to appropriate aggregation modules 406 and 408 in the second level of aggregation modules 418. Similarly, the streaming module 400 may forward output from the second level of aggregation modules 418 to the third level of aggregation modules 420. The output may be provided to aggregation modules in subsequent levels based on the aggregation topology 128. For example, the topology might indicate that output from aggregation module 402 should be provided to aggregation module 406 and output from aggregation module 404 should be provided to aggregation module 408. Similarly, should any aggregation modules in the second level of aggregation modules 418 produce output, the output may be provided, as indicated by the topology, to aggregation modules 410, 412, and/or 414 in the third level of aggregation modules 420.

The sequence described in the preceding paragraph may be described as a cycle of streaming module 400. The cycle may comprise receiving values from a log file and providing the values to appropriate aggregation modules 402 and 404 in the first level of aggregation modules 416. The cycle may further involve providing output produced by aggregation modules 402 and 404 in the first level of aggregation modules 416 to aggregation modules 406 and 408 in the second level of aggregation modules 418, and so on until the last level is reached and provided with values.

Figure 5:
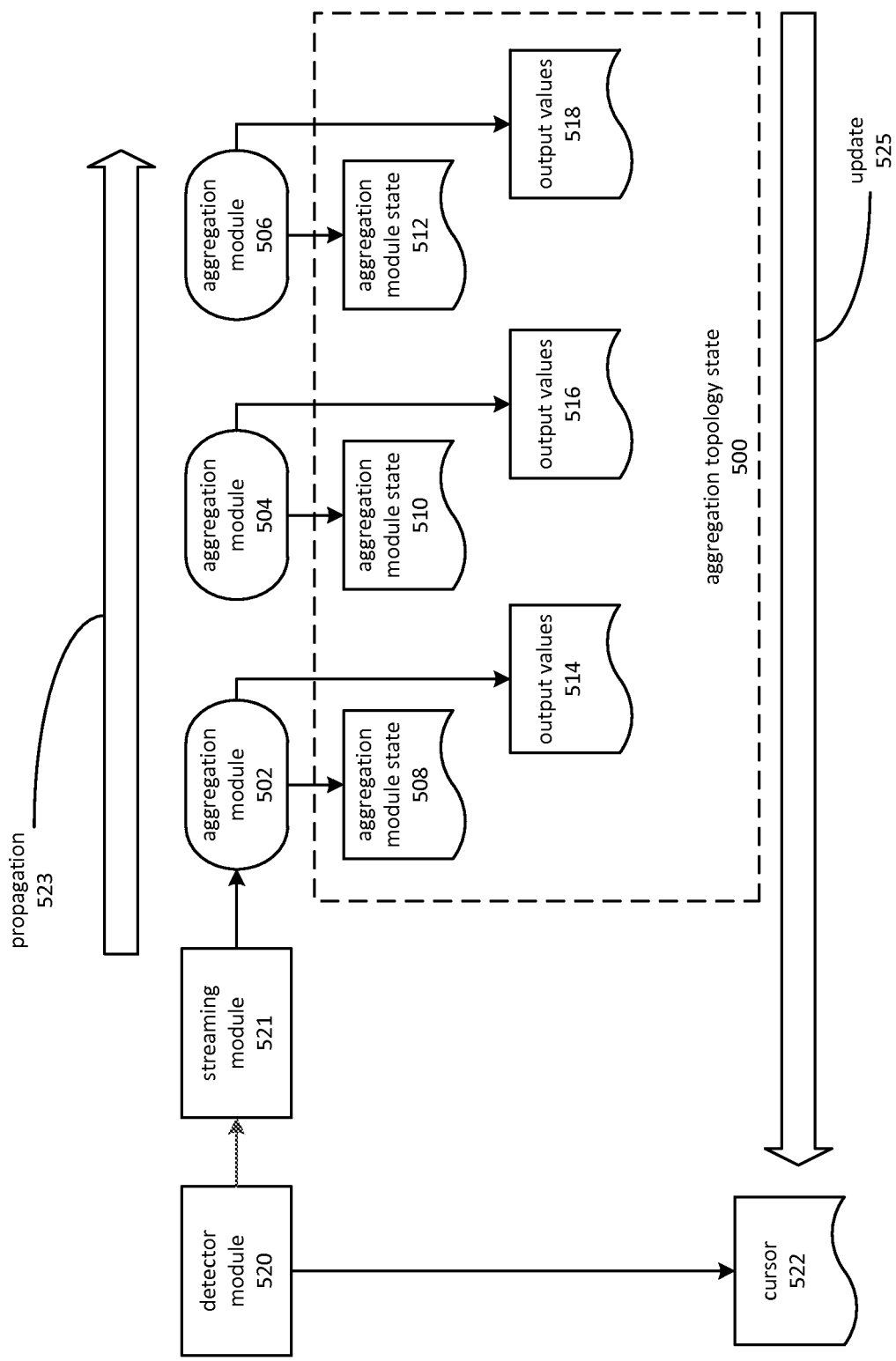
FIG. 5 is a block diagram depicting per-cycle saving of aggregation module state.

FIG. 5 is a block diagram depicting per-cycle saving of aggregation module state. As noted, the streaming module 400 depicted in FIG. 4 may cause state information for each aggregation module in a topology to be saved after each cycle. In some instances, this may comprise saving state information for the aggregation modules 502-506 in response to processing a unit of data obtained from a log file. In some instances, state information for the aggregation modules 502-506 is saved to a low-latency memory such as random-access memory, but is not made durable by saving to a durable but higher-latency storage device, such as a solid-state drive. During each cycle, data may be supplied to the first-level aggregation module 502 and any output propagated to subsequent levels of the aggregation topology, e.g. to aggregation module 504, and if aggregation module 504 produces output, to aggregation module 506. Upon completion of the cycle, a cursor 522 may be updated and its state made durable by being written to a durable storage device.

The detector module 520 that is depicted in FIG. 5 may maintain a cursor 522. The cursor 522 may comprise state information that indicates what data has been previously processed, e.g., by being provided to all applicable first-level aggregation modules. The cursor 522 may, in some instances, be a timestamp, sequence number, or other value indicative of a time. The various log files or other data sources may utilize a synchronized global time also used to express a value for the cursor 522. In some instances, the synchronized global time values may be obtained from a designated clock, or from multiple clocks synchronized from a designated clock.

The cursor 522 may be updated, in some instances, with each cycle so that it is synchronized with the aggregation topology state 500. In some instances, however, the cursor may be unsynchronized with the aggregation topology state 500. In such cases, the aggregation topology state may include information indicating what data it has already processed. Values prior to that state may be ignored by the aggregation modules. In some instances, the cursor 522 and the aggregation topology state 500 may be synchronized under most operating conditions but may occasionally become unsynchronized. This could occur, for example, in the event of system failure.

The aggregation topology state 500 may include state information saved by the aggregation modules 502, 504, and 506 on each cycle. The state information may comprise data that reflects values previously provided to the aggregation module, such as a running total or an average of values received for the current aggregation period. For example, aggregation module state 508 may be written for aggregation module 502 after the aggregation module 502 has been provided with a value for the current cycle. If the aggregation module 502 produces an output, it may write output values 514 to the aggregation topology state. The output values 514 may then be provided to aggregation module 504. The aggregation module state 510 may then be saved. When the output values 516 are created, they too may be stored in the aggregation topology state 500, and provided to aggregation module 506. The aggregation module state 512 may be retained in the aggregation topology state 500, as may any output values 518.

However, as noted, the aggregation topology state 500 may be saved to a low-latency memory, rather than being made durable by saving to a durable storage device such as a solid-state drive, magnetic disk drive, or other medium which would be preserved in the event of a failure such as power loss. Instead, after a propagation phase 523, an update phase 525 may include state of the cursor 522 being saved to a durable storage device. The cursor 522, which may comprise a timestamp, serial number, or some other value or values indicative of a time or a sequence, may be sufficient to resume processing of the metric data without data loss. After a system failure, processing may resume at a time interval based on the cursor value. This may involve backtracking the cursor to the nearest interval. For example, if aggregation module 502 is aligned to a 60 second interval and the most recent cursor value was 35 seconds after midnight, processing might resume at midnight. The intervals of the aggregation modules 502-504 may each be aligned along the same interval boundaries.

Figure 6:
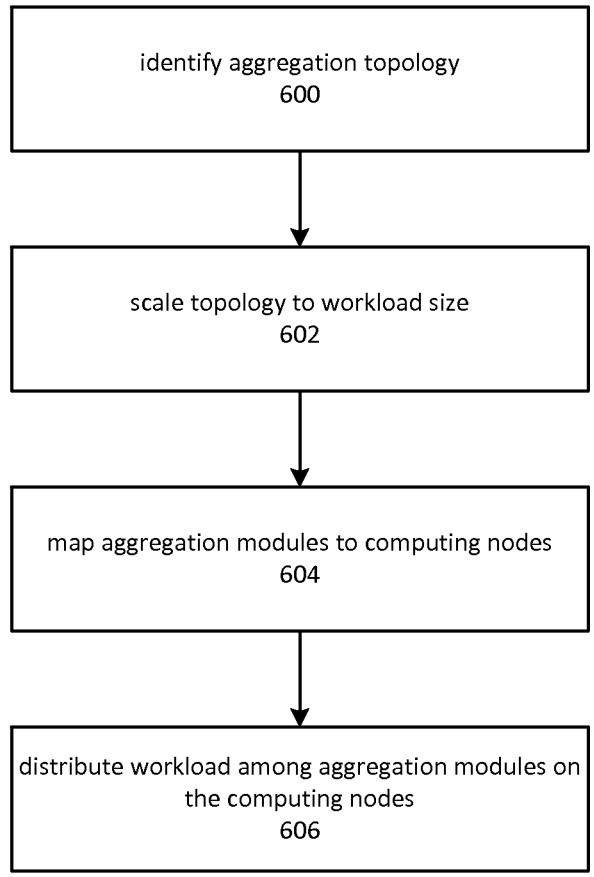
FIG. 6 is a flow diagram depicting scaling an aggregation topology.

In some instances, such as were a large amount of log data is to be processed, the aggregation topology may be scaled and mapped to a plurality of computing nodes. FIG. 6 is a flow diagram depicting scaling an aggregation topology. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts identifying an aggregation topology. Identification of an aggregation topology may involve loading metadata or an instruction set that specifies input and output relationships between various aggregation modules. The information may also indicate the nature of the aggregation operations to be performed, and may in some instances include computer executable instructions, or interpreted instructions, for performing the aggregations.

Block 602 depicts scaling the aggregation topology based on workload size. This may comprise one or more of a number of operations. In some cases, an aggregation module may be duplicated and executed on two or more computing nodes, using a partitioned input set. In some cases, an aggregation module may itself be partitioned. For example, a 60-second aggregation module might be partitioned into two 30-second aggregation modules which in turn feed their output into a 60-second aggregation module.

Block 604 depicts mapping the scaled aggregation modules to computing nodes. The operations performed by the various aggregation modules may be distributed among a plurality of computing nodes. This may be based on workload associated with each aggregation module. For example, shorter aggregation periods may be associated with greater computational workload, and may therefore the associated aggregation modules may be split among a relatively large number of computing nodes. Longer aggregation periods may involve fewer computations, and may accordingly be performed by aggregation modules operating on a relatively small number of computing nodes.

Block 606 depicts distributing workload among aggregation modules operating on a plurality of computing nodes. This may involve transmitting metric values from log files to aggregation modules that are first-level in the scaled aggregation topology, and transmitting output values to subsequent levels of the topology.

Figure 7:
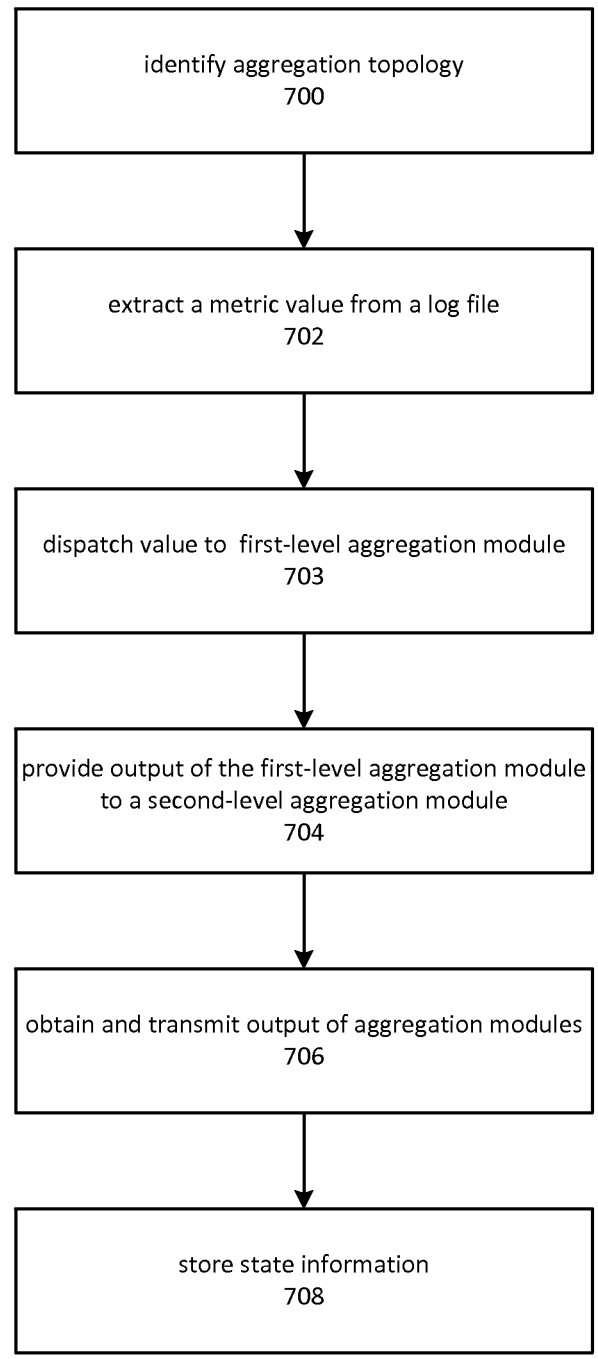
FIG. 7 is a flow diagram depicting an example of metric processing.

FIG. 7 is a flow diagram depicting an additional example of a metric processing system. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts identifying elements of an aggregation topology. This may include, for example, determining which aggregation modules are to be applied to a set of metric data, and how the inputs and outputs of various aggregation modules are to be mapped. A first-level aggregation module may be identified based on a mapping between the type of a metric value extracted from a log file and the type and aggregation period associated with an aggregation module. For example, a raw metric value might pertain to CPU utilization. An aggregation topology might, for example, comprise three aggregation modules corresponding to CPU utilization, as well as some number of additional aggregation modules pertaining to other types of metrics, such as memory consumption, latency, and so forth. Of the three aggregation modules pertaining to CPU utilization, the module with the shortest aggregation period may be considered to be the first-level aggregation module.

Note that each aggregation module may be considered, for the purposes of the topology, as a separate entity. However, in some cases the same set of instructions may be used or reused for different levels of aggregation of for different metrics.

Block 702 depicts extracting a metric value from a log file. Values may be extracted one at a time or in blocks of various sizes. The latter may be more efficient if there is a large backlog of unprocessed metrics.

Embodiments may maintain a cursor that is indicative of a location within one or more log files. The information may indicate that values prior to the cursor have been processed. The information may be stored on a persistent memory device so that it is durable in the event of system failure. In some instance, the cursor may be expressed as a time value.

As depicted by block 703, the metric value extracted from the log file may be dispatched to a first-level aggregation module based one or more properties associated with the metric value. In some instances, a streaming module 108, as depicted by FIG. 1, may match properties associated with the metric value in the log file to corresponding properties of a stream 300. For example, a metric value may be associated with certain identifiers, such as the instance identifier 302, the process identifier 304, and the metric identifier 306 depicted in FIG. 3.

Block 704 depicts providing the output of the first-level aggregation module to a second-level aggregation module. The first-level aggregation module may accumulate data until it has accumulated an amount of data that is sufficient for calculating the desired aggregation level. Once the first-level aggregation module has received a sufficient set of values, it may calculate the aggregated value for the current period. The aggregated value may then be provided to the second-level aggregation module as an input.

Block 706 depicts obtaining the output of an aggregation module and transmitting it. The aggregation module may be at any level of the aggregation. The output of an aggregation module may be transmitted to a client process in response to the aggregation module receiving a sufficient set of values for calculating the corresponding aggregate value.

A streaming module may be used not only to provide input values to the various levels of the aggregation topology, but also to provide values to a client process. For example, the streaming module 400 may act as a database of metric values at various levels of aggregation. The values depicted in FIG. 3, such as the instance identifier 302, process identifier 304, metric identifier 306, and aggregation level indicator 308 may function as a primary key to retrieve the desired value.

A client process may receive the input and use it to perform various functions, such as displaying status information on a dashboard, monitoring status, performing analysis, and so on.

Block 708 depicts storing state information for the first-level and second-level aggregation modules. In some instances, the state information can include a timestamp or other value that may act as a cursor associated with the most recently processed value. The cursor may indicate a location of an entry in a log file corresponding to the most recently processed value.

The cursor may be saved at the end of each cycle. A cycle can include providing a value, or block of values, to all aggregations modules associated with first-level aggregation modules in the topology. In some cases, no input is provided to a particular aggregation module during a cycle.

The internal state of the aggregation modules may change with each cycle. The information may be stored—often as a side effect of processing input values—in a low-latency memory such as RAM. Typically, the internal state of the aggregation modules, stored in this way, is not durable. However, some state information may be made durable. This may include (and in some cases, be limited to) the cursor information.

In the event of a system failure, the cursor may be used to resume processing of the log file without data loss, even if internal state of the aggregation modules is not saved. Processing of log data may resume at a point determined based on the value of the most recently saved cursor and the alignment of the aggregation modules in the topology. This may involve backtracking from the time indicated by the cursor to a point in time aligned with the aggregation modules. For example, the first-level aggregation modules in a topology might be aligned with one-minute intervals starting on the hour. If the cursor indicates a point in time of five minutes and thirty seconds past the hour, processing might resume at five minutes past the hour.

Figure 8:
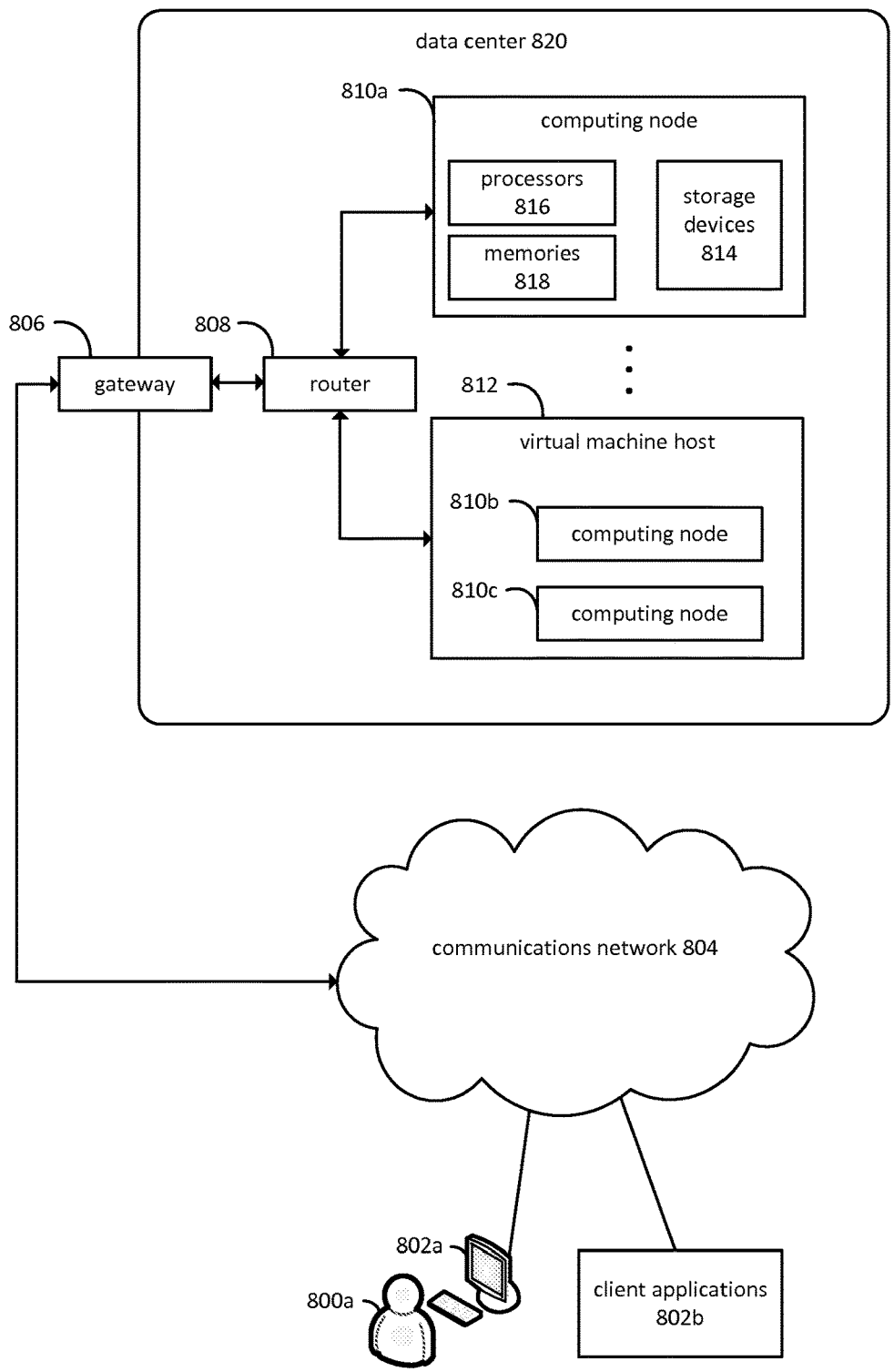
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b, and 810c within a data center 820. Alternatively, client applications 802b may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810a, 810b, and 810c, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a, 810b, and 810c. Some of these intermediate layers may themselves comprise processes executing on one or more of the computing nodes. Computing nodes 810a, 810b, and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818, and one or more storage devices 814. Processes on computing node 810a may execute in conjunction with an operating system or alternatively may execute as a bare-metal process that directly interacts with physical resources, such as processors 816, memories 818, or storage devices 814.

Computing nodes 810b and 810c are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
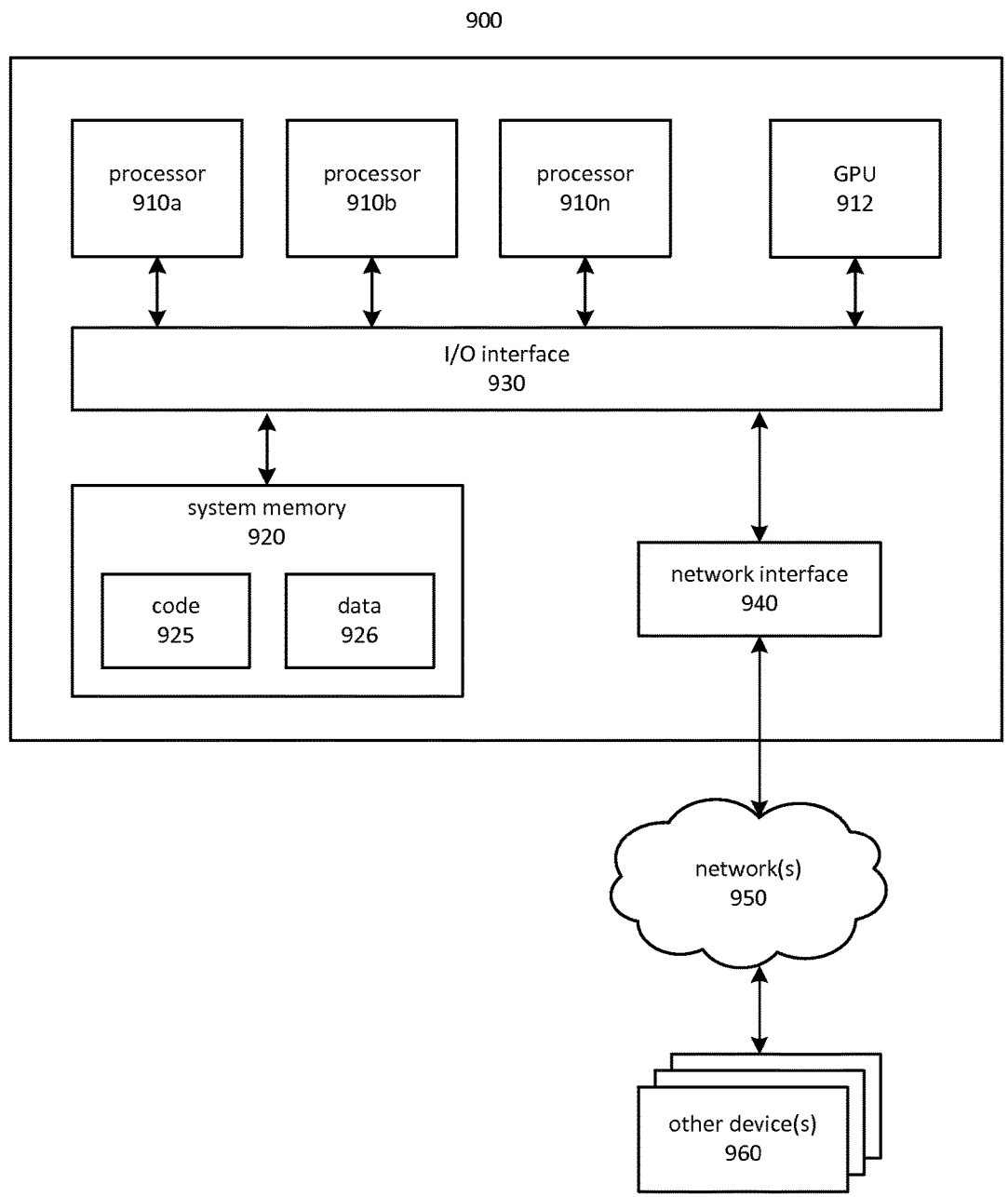
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing nodes operable as a service, the service generating a plurality of log entries during operation; and
   one or more memories having stored thereon computer-readable instructions that, upon execution by a computing device, cause the system at least to:
   identify, based on a topology of aggregation modules, a first aggregation module corresponding to a first level of the topology;
   identify, based on the topology, a second aggregation module corresponding to a second level of the topology;
   provide a first value to the first aggregation module, the first value corresponding to an entry in the plurality of log entries;
   provide a second value to the second aggregation module, the second value obtained based at least in part on output of the first aggregation module using the first value and one or more additional values corresponding to entries in the plurality of log entries;
   obtain a third value based at least in part on output of the second aggregation module using the second value and one or more additional values corresponding to output of the first aggregation module;
   store information indicative of a location of the entry in the plurality of log entries for retrieval by a client process to provide a real-time view of the operation of the service.

2. The system of claim 1, further comprising one or more memories having stored thereon computer-readable instructions that, upon execution by the computing device, cause the system at least to:
   store the information indicative of the location of the entry in response to providing the first value to the first aggregation module and the second value to the second aggregation module.

3. The system of claim 1, further comprising one or more memories having stored thereon computer-readable instructions that, upon execution by the computing device, cause the system at least to:
   store the information indicative of the location of the entry in response to providing the first value to all aggregations modules associated with a top level of aggregation modules in the aggregation topology.

4. The system of claim 1, wherein the information indicative of the location of the entry is a timestamp.

5. The system of claim 1, further comprising one or more memories having stored thereon computer-readable instructions that, upon execution by the computing device, cause the system at least to:
   transmit the second value to a client process in response to the first aggregation module receiving a first set of values corresponding to a first aggregation period; and
   transmit the third value to the client process in response to the second aggregation module receiving a second set of values, calculated by the first aggregation module, corresponding to a second aggregation period.

6. A method comprising:
   providing a first value to a first aggregation module corresponding to a first level of a topology of aggregation modules, the first value corresponding to an entry in a plurality of log entries;
   providing a second value to a second aggregation module corresponding to a second level of the topology, the second value obtained based at least in part on output of the first aggregation module using the first value and one or more additional values corresponding to entries in the plurality of log entries;
   obtaining a third value based at least in part on output of the second aggregation module using the second value and one or more additional values corresponding to output of the first aggregation module;

storing information indicative of a location of the entry in the plurality of log entries; and providing the second value to a client process, wherein the second value is provided prior to obtaining the third value.

7. The method of claim 6, wherein the information indicative of the location of the entry is indicative of completed processing of the first value.

8. The method of claim 6, wherein the information indicative of the location of the entry comprises an offset into a source of the plurality of log entries, wherein data prior to the offset has been processed by the first level of the topology.

9. The method of claim 6, wherein the information indicative of the location of the entry comprises a value indicative of time.

10. The method of claim 6, further comprising:
storing, in a low-latency memory, state information for the first aggregation module and the second aggregation module in response to providing the first value to all aggregations modules associated with a top level of aggregation modules in the topology; and
storing, on a durable storage device, the information indicative of the location of the entry.

11. The method of claim 6, wherein the first aggregation module calculates the second value in response to receiving a set of values corresponding to a first aggregation period.

12. The method of claim 6, further comprising:
transmitting the second value to a client process in response to the first aggregation module receiving a set of values corresponding to a first aggregation period; and
transmitting the third value to the client process in response to the second aggregation module receiving a set of values, calculated by the first aggregation module, corresponding to a second aggregation period.

13. The method of claim 6, further comprising:
resuming processing, subsequent to a system failure, of the plurality of log entries based at least in part on an interval of the first aggregation module and the information indicative of the location of the entry in the plurality of log entries.

14. A non-transitory computer-readable storage medium having stored thereon instructions that, upon execution by one or more computing devices, cause the one or more computing devices at least to:
provide a first value to a first aggregation module corresponding to a first level of a topology, the first value corresponding to an entry in a plurality of log entries;
provide a second value to a second aggregation module corresponding to a second level of the topology, the second value obtained based at least in part on output of the first aggregation module using the first value and one or more additional values corresponding to entries in the plurality of log entries;
obtain a third value based at least in part on output of the second aggregation module using the second value and one or more additional values corresponding to output of the first aggregation module;
store a timestamp associated with the entry in the plurality of log entries; and
provide, prior to obtaining the third value, the second value to a client process.

15. The non-transitory computer-readable storage medium of claim 14, comprising further instructions that, upon execution by the one or more computing devices, cause the one or more computing devices to at least:
store, in a low-latency memory, state information for the first aggregation module and the second aggregation module in response to providing the first value to all aggregations modules associated with a top level of aggregation modules in the topology; and
store the timestamp on a durable storage device.

16. The non-transitory computer-readable storage medium of claim 14, comprising further instructions that, upon execution by the one or more computing devices, cause the one or more computing devices to at least:
store the timestamp in response to providing the first value to all aggregations modules associated with a top level of aggregation modules in the topology.

17. The non-transitory computer-readable storage medium of claim 14, comprising further instructions that, upon execution by the one or more computing devices, cause the one or more computing devices to at least:
process the plurality of log entries based at least in part on an interval of the first aggregation module and the timestamp.

18. The non-transitory computer-readable storage medium of claim 14, wherein the first aggregation module calculates the second value in response to receiving a set of values corresponding to a first aggregation period.

19. The non-transitory computer-readable storage medium of claim 14, wherein the second aggregation module is associated with a second aggregation period longer than a first aggregation period.

20. The non-transitory computer-readable storage medium of claim 14, comprising further instructions that, upon execution by the one or more computing devices, cause the one or more computing devices to at least:
transmit the second value to a client process in response to the first aggregation module receiving a set of values corresponding to a first aggregation period; and
transmit the third value to the client process in response to the second aggregation module receiving a set of values, calculated by the first aggregation module, corresponding to a second aggregation period.

* * * * *